(12) United States Patent
Ito et al.

(10) Patent No.: US 11,679,668 B2
(45) Date of Patent: Jun. 20, 2023

(54) VEHICLE TANK STRUCTURE

(71) Applicant: MAZDA MOTOR CORPORATION, Hiroshima (JP)

(72) Inventors: Tsuyoshi Ito, Aki-gun (JP); Kenichiro Araki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 367 days.

(21) Appl. No.: 17/160,186

(22) Filed: Jan. 27, 2021

(65) Prior Publication Data

US 2021/0260993 A1   Aug. 26, 2021

(30) Foreign Application Priority Data

Feb. 25, 2020   (JP) .............................. JP2020-029340

(51) Int. Cl.
*B60K 15/063*   (2006.01)
*B62D 21/02*   (2006.01)
*B62D 25/20*   (2006.01)

(52) U.S. Cl.
CPC ............ *B60K 15/063* (2013.01); *B62D 21/02* (2013.01); *B62D 25/2027* (2013.01); *B60K 2015/0634* (2013.01); *B60Y 2306/01* (2013.01)

(58) Field of Classification Search
CPC ....................... B60K 15/063; B60K 2015/0634
See application file for complete search history.

(56) References Cited

U.S. PATENT DOCUMENTS

| | | | | |
|---|---|---|---|---|
| 5,702,125 A | * | 12/1997 | Nakajima | ............ B60K 15/063 |
| | | | | 280/834 |
| 9,139,229 B2 | * | 9/2015 | Mikami | ............... B60K 15/063 |
| 2005/0046170 A1 | * | 3/2005 | Uhara | .................. B60K 15/063 |
| | | | | 280/834 |
| 2005/0211496 A1 | * | 9/2005 | Ito | ........................ B60K 15/063 |
| | | | | 180/314 |

FOREIGN PATENT DOCUMENTS

| | | | |
|---|---|---|---|
| JP | H0858404 A | * | 3/1996 |
| JP | 2014-043242 A | | 3/2014 |

* cited by examiner

*Primary Examiner* — Minnah L Seoh
*Assistant Examiner* — Ryan Edward Hardy
(74) *Attorney, Agent, or Firm* — Studebaker & Brackett PC

(57) ABSTRACT

A protection measure for a vehicle during a side collision is provided, and an oil feeding pipe is attached to a side face of a tank. A vehicle tank structure has a pair of left and right rear frames extending in the vehicle front-rear direction, a floor panel coupling the rear frames, and a tank provided below the floor panel. A side face part of the tank includes a connection port to which an oil feeding pipe is connected, the side face part being directed toward the vehicle-width-direction outer side. A hit-first face part located on the vehicle-width-direction outer side relative to a distal end of the connection port is located above a mounting face part at which the connection port is provided.

16 Claims, 5 Drawing Sheets

VEHICLE TANK STRUCTURE

TECHNICAL FIELD

The present disclosure relates to a vehicle tank structure capable of protecting a connection port to which an oil feeding pipe is connected.

BACKGROUND ART

A tank that stores fuel is provided between a pair of left and right rear frames extending in the vehicle front-rear direction, and an oil feeding pipe for fuel injection is connected to this tank. A tubular connection port to which the oil feeding pipe in the tank is connected has been conventionally provided at a rear face of the tank for the purpose of protecting the connection port, as disclosed in Japanese Patent Laid-Open No. 2014-43242. However, depending on, for example, the layout of the oil feeding pipe, the oil feeding pipe may be desirably attached to a side face of the tank.

SUMMARY

Where the connection port is provided at the side face of the tank, at the time of a side collision, deformation of the rear frames or a floor panel fixed between the rear frames may damage the projecting connection port. In order to suppress such damage, it is conceivable to provide reinforcement so that the vehicle-body deformation is further suppressed, but this increases cost and weight. The present disclosure enables attachment of an oil feeding pipe to a side face of a tank while suppressing damage of a connection port at the time of side collision.

A vehicle tank structure according to the present disclosure includes a pair of left and right rear frames extending in the vehicle front-rear direction, and a floor panel coupling the rear frames, a tank being provided below the floor panel, wherein a side face part of the tank includes a connection port to which an oil feeding pipe is connected, the side face part being directed toward a vehicle-width-direction outer side; and a mounting face part at which the connection port is provided, and a hit-first face part located on the vehicle-width-direction outer side relative to a distal end of the connection port, at a position corresponding to the mounting face part in the vehicle front-rear direction, are formed at the side face part.

In this configuration, when the rear frame is deformed toward the vehicle-width-direction inner side by side collision such as pole collision, the hit-first face part receives a collision load and is deformed prior to the connection port. The hit-first face part absorbs collision energy, and thereby input of the collision load to the connection port and the mounting face part which are located on the vehicle-width-direction inner side relative to the hit-first face part is avoided or suppressed.

In an aspect of the present disclosure, a configuration may be adopted in which the hit-first face part is provided at a position adjacent to the rear frame in the vehicle width direction. In this configuration, a collision load input from the rear frame to the tank at the time of side collision is reliably transferred to the hit-first face part opposed thereto in the vehicle width direction.

In another aspect of the present disclosure, the hit-first face part includes a pair of continuous faces extending toward the vehicle-width-direction inner side in a plan view, and in which the continuous faces are shaped such that a distance between the continuous faces in the vehicle front-rear direction expands toward the vehicle-width-direction inner side. In this configuration, at least one of the pair of continuous faces extends diagonally toward the vehicle-width-direction inner side, and the continuous faces are shaped in a plan view so as to expand toward the vehicle-width-direction inner side, so that a portion having the hit-first face part has a shape such as a wide triangle or trapezoid in a plan view on the base side. Thus, compression deformation which occurs after the hit-first face part receives a collision load at the time of side collision is expressed in a stable behavior.

In a further aspect of the present disclosure, a most distal end part of the hit-first face part located on the vehicle-width-direction outermost side is formed at a position corresponding to the connection port in the vehicle front-rear direction. In this configuration, the positions of the connection port and the most distal end part in the vehicle front-rear direction correspond to each other, so that a distance from the distal end of the connection port to the hit-first face part can be made longer.

In a still further aspect of the present disclosure, a bulge is formed at the floor panel, the bulge bulging upward relative to a cross member coupling the rear frames, and in which an inner face of the bulge faces a portion including the hit-first face part. In this configuration, the hit-first face part can be provided in an aspect of being opposed to or approaching the inner face of the bulge, so that the dimension of the hit-first face part in the height direction can be made long. Thus, a collision load at the time of side collision is absorbed satisfactorily.

According to the present disclosure, in a case where the connection port is provided at the side face part of the tank, even when a collision load due to side collision is input to the tank, the hit-first face part absorbs collision energy, so that damage of the connection port and the mounting face part can be suppressed. Thus, it is possible to attach the oil feeding pipe to a side face of the tank.

DETAILED DESCRIPTION

A mode for carrying out the present disclosure will be explained with reference to the following drawings.

Figure 1:
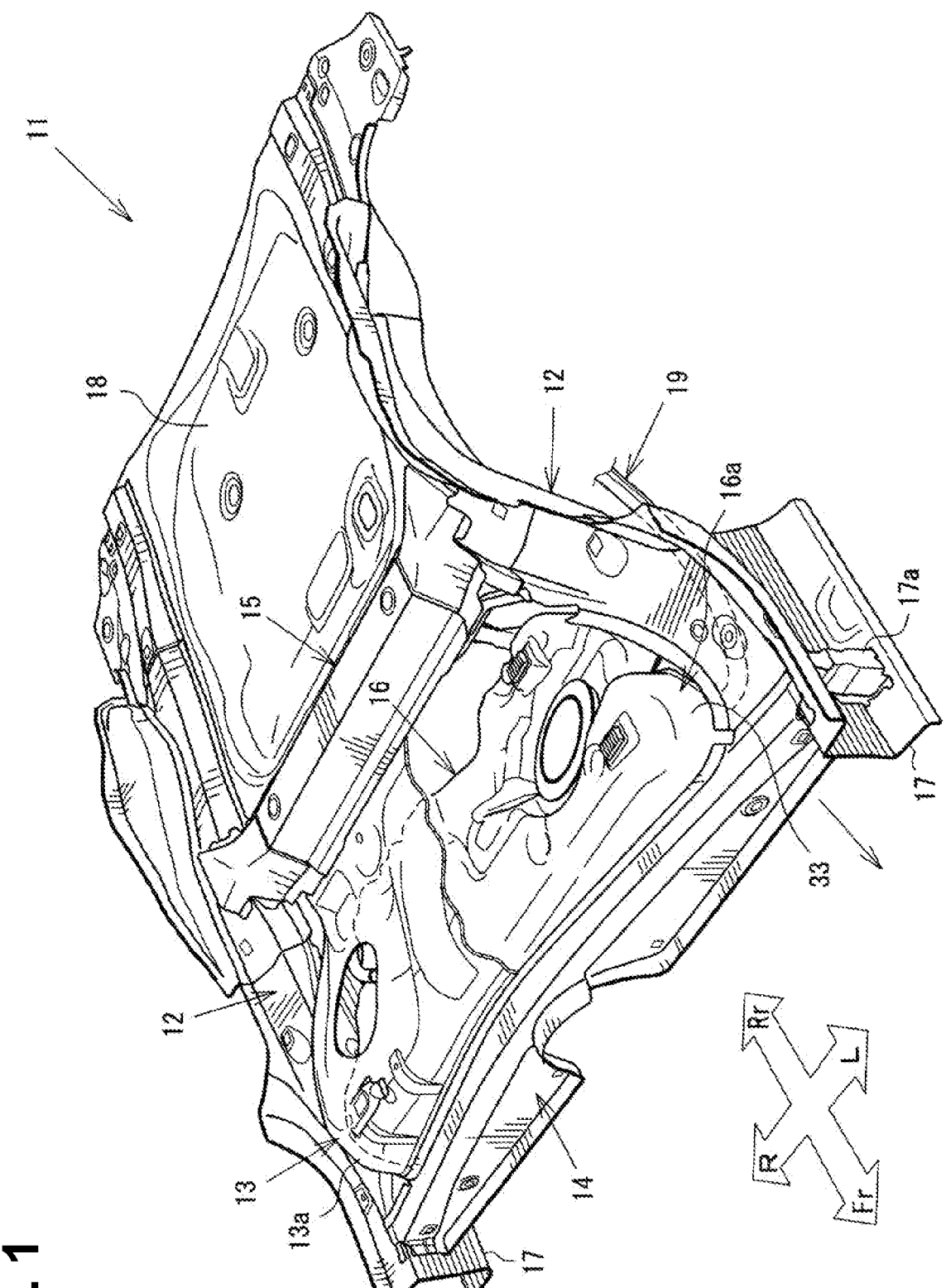
FIG. 1 is a perspective view of a vehicle-body lower structure having a tank.
Figure 2:
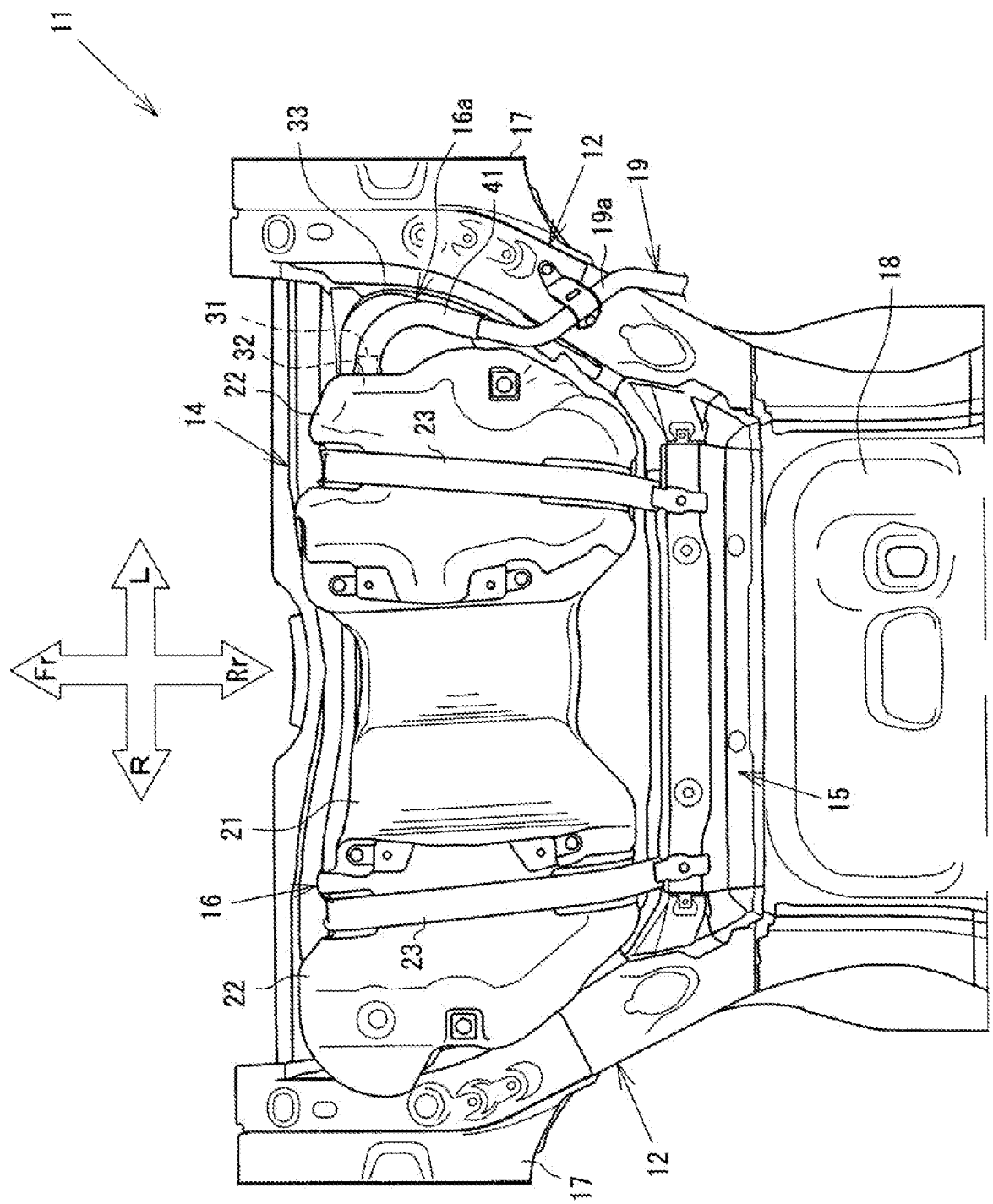
FIG. 2 is a bottom view of the vehicle-body lower structure having the tank.

FIG. 1 is a partially cutaway perspective view of a rear vehicle-body lower structure 11 of a vehicle, and FIG. 2 is a bottom view thereof in a state of being viewed upward from the lower side. In FIGS. 1 and 2, each white arrow indicates a direction. In the arrows, reference character "Fr" means the front side, reference character "Rr" means the rear side, and a direction connecting these is the vehicle front-rear direction. Reference character "L" means the left side, reference character "R" means the right side, and a direction connecting these is the vehicle width direction.

As illustrated in these figures, the rear vehicle-body lower structure 11 has a pair of left and right rear frames 12, a floor panel 13 coupling the rear frames 12, a front-side cross member 14 provided at a front end of the floor panel 13, and a rear-side cross member 15 provided at a rear end of the floor panel 13. A tank 16 for storing fuel is provided below the floor panel 13.

The rear frame 12 is a framework member having a closed cross-section and extends in the vehicle front-rear direction. The rear frame 12 bends in the longitudinal direction, in which an intermediate part in the longitudinal direction is higher than a front side part, and an interval between the pair of rear frames 12 is narrower at an intermediate part and a rear side part than at a front side part. In FIGS. 1 and 2, reference numeral 17 denotes an inner side member of a side sill.

The floor panel 13 is provided at a position of a top face of the rear frame 12 and expands in a predetermined range in the front-rear and left-right directions from a position of a front end of the rear frame 12 to a region therebehind. A rear end part of the floor panel 13 extends up to the intermediate part of the rear frame 12. The interval between the pair of rear frames 12 is narrower at the intermediate part than the front side part, so that the plan-view shape of the floor panel 13 is substantially an isosceles trapezoidal shape.

This floor panel 13 serves as a portion supporting a rear seat. As described above, the front side part of the rear frame 12 is lower than a rear side part thereof, so that a bulge 13a bulging upward relative to the front-side cross member 14 is formed at a front side part of the floor panel 13. The bulge 13a has a largely curved curve face at a front end edge and both left and right side edges in a top face thereof, and the top face of the bulge 13a supports the rear seat and is set to a height necessary for accommodating the tank 16.

The front-side cross member 14 is a so-called No. 3 cross member and, as a framework member having a closed cross-section, connects the left and right rear frames 12. A position at which the front-side cross member 14 is provided in the inner side member 17 of the side sill is provided with a joint member 17a and reinforced. Similarly, the rear-side cross member 15 is a so-called No. 4 cross member and, as a framework member having a closed cross-section, connects the left and right rear frames 12. A panel provided rearward relative to the rear-side cross member 15 between the rear frames 12 is a trunk floor pan 18.

While the tank 16 is provided below the floor panel 13 whose both left and right sides are interposed between the rear frames 12, in the tank 16 of the present embodiment, an oil feeding pipe 19 for fuel injection is attached to a side face part 16a of the tank 16 which is directed toward the vehicle-width-direction outer side and faces the rear frame 12.

First, for explanation of summary of the tank 16, the plan-view shape or bottom-view shape of the tank 16 is formed in a substantially isosceles trapezoidal shape similarly to the plan-view shape of the floor panel 13, and the tank 16 is provided with necessary configurations such as a pump unit and a cut-off valve, which are not illustrated.

The tank 16 has the substantially isosceles trapezoidal plan-view shape, in which the front side is wide and the rear side is narrower than the front side, so that the above-described "side face part" 16a serves as a face in a mode of being inclined or curved toward the vehicle-width-direction inner side from the front side in the vehicle front-rear direction to the rear side. The mode of this "side face part" 16a varies depending on the plan-view shape of the tank 16.

To attach the oil feeding pipe 19 to the side face part 16a, a part of the side face part 16a is provided with a connection port 31 to which the oil feeding pipe 19 is connected. In this example, the side face part 16a to which the oil feeding pipe 19 is attached is the side face part 16a on the left side of the left and right sides.

Figure 3A:
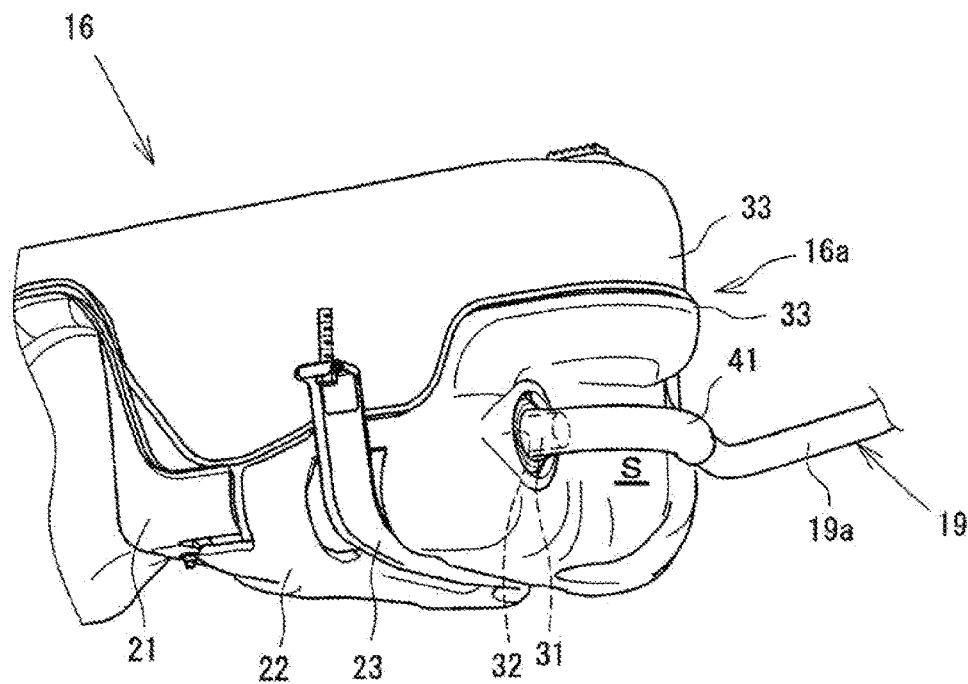
FIGS. 3A and 3B are perspective views of a main part of the tank.
Figure 3B:
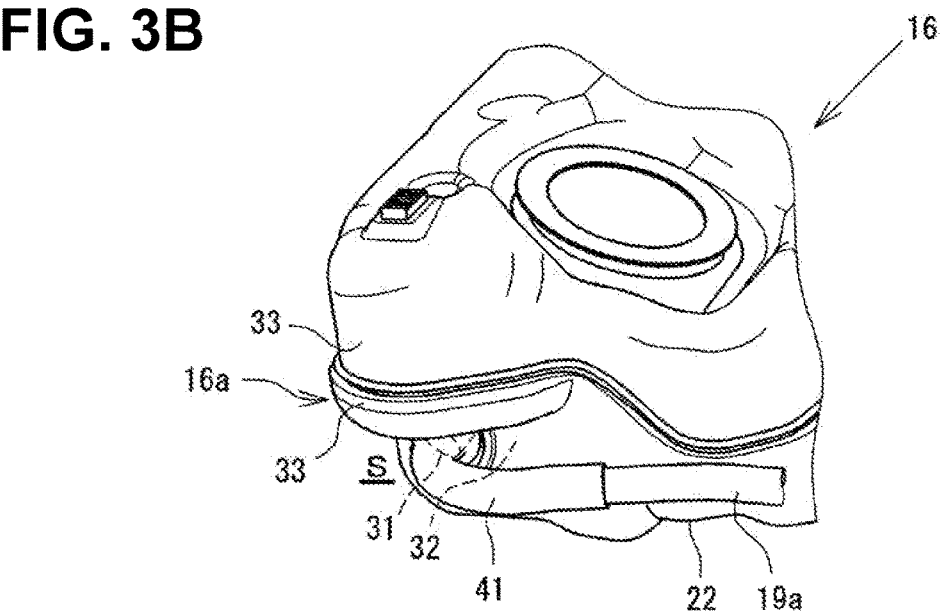

FIGS. 3A-3B are perspective views illustrating the side face part 16a on the side provided with the connection port 31 in the tank 16. FIG. 3A illustrates a state where a front end portion of the side face part 16a is viewed upward from the diagonally front lower side, and FIG. 3B illustrates a state where a front side portion of the side face part 16a is viewed downward from the diagonally rear upper side. In the figures, reference numerals 21 and 22 each denote a protector covering a lower shell part forming a lower side portion of the tank 16, and reference numeral 23 denotes a fixed band mainly for preventing dropping of the tank 16.

As illustrated in FIGS. 2, 3A, and 3B, the side face part 16a of the tank 16 has a mounting face part 32 at which the connection port 31 is provided, and a hit-first face part 33 located on the vehicle-width-direction outer side relative to a distal end of the connection port 31, at a position corresponding to the mounting face part 32 in the vehicle front-rear direction. In other words, the side face part 16a forms the mounting face part 32 at a position receding toward the vehicle-width-direction inner side relative to the hit-first face part 33 located on the vehicle-width-direction outer side, and has a space S on the vehicle-width-direction outer side relative to the distal end of the connection port 31.

The mounting face part 32 and the hit-first face part 33 are disposed in the up-down direction. In this example, the mounting face part 32 is provided under the hit-first face part 33. The mounting face part 32 and the hit-first face part 33 are each provided at a position of the side face part 16a on the front side in the vehicle front-rear direction.

Figure 4:
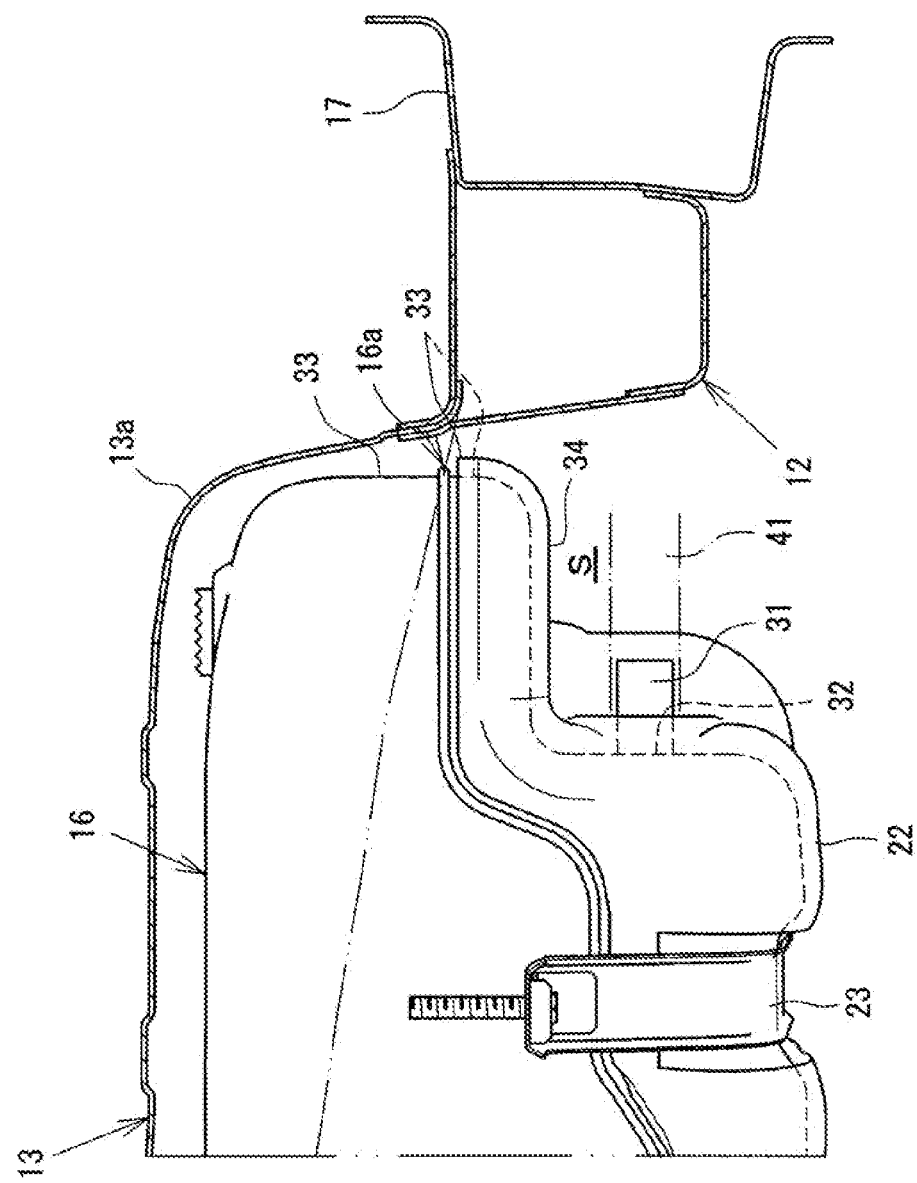
FIG. 4 is a front view of the main part when viewed from the vehicle front side.
Figure 5:
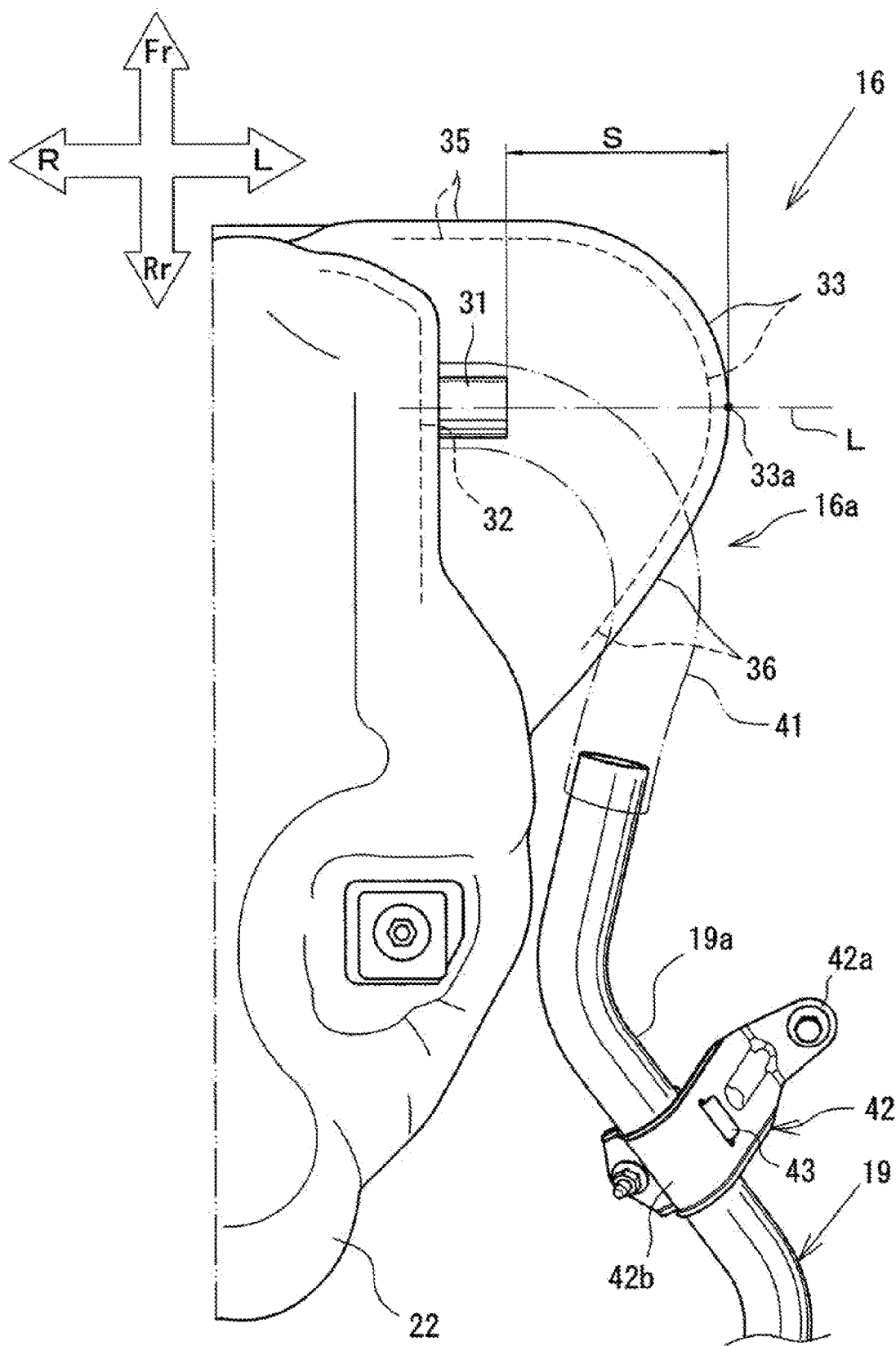
FIG. 5 is a bottom view of the main part when viewed upward from the vehicle lower side.

As illustrated in FIG. 4, which is a view of a main part when viewed from the vehicle front side, and FIG. 5, which is a bottom view of the main part, the mounting face part 32 is formed at the lower shell part in the side face part 16a of the tank 16 and is a plane directed straight toward the vehicle-width-direction outer side. The mounting face part 32 is formed at a lower side portion of the lower shell part.

The tubular connection port 31 protrudes substantially at the center of the mounting face part 32. The projection length (distal end position) of the connection port 31 is set in consideration of the size or shape of the hit-first face part 33 and the positional relationship with the hit-first face part 33 (see FIG. 5).

As illustrated in FIG. 4, the hit-first face part 33 is formed at both the lower shell part forming the lower side portion of the tank 16 and an upper shell part forming an upper side portion thereof. Between the mounting face part 32 and hit-first face part 33 of the lower shell part, a step face 34 extending in an eaves shape in the horizontal direction is formed.

The plan-view shape of the hit-first face part 33 is a gentle arc shape as a whole. The lower shell part is covered with the protector 22, so that a part of the protector 22 also serves as the hit-first face part 33. The hit-first face part 33 has a pair of continuous faces 35 and 36 extending toward the vehicle-width-direction inner side in a plan view. These continuous faces 35 and 36 are shaped such that a distance between the continuous faces 35 and 36 in the vehicle front-rear direction expands toward the vehicle-width-direction inner side.

As illustrated in FIG. 5, the hit-first face part 33 of the illustrated example has the continuous face 35 extending in the vehicle width direction at a front end face of the tank 16, and the continuous face 36 extending diagonally with respect to the vehicle width direction and the vehicle front-rear direction. The pair of continuous faces 35 and 36 forms a base which is wide for the hit-first face part 33, and is in a mode of stably supporting the hit-first face part 33.

As illustrated in FIG. 4, the hit-first face part 33 as described above is provided at a position adjacent to the rear frame 12 in the vehicle width direction. Specifically, mainly a lower side portion of the hit-first face part 33, namely, a portion of the lower shell part, opposes the rear frame 12. An upper side portion of the hit-first face part 33, namely, a portion of the upper shell part, is opposed to an inner face of the bulge 13a of the floor panel 13, and a peripheral portion of the hit-first face part 33 such as a top face including the hit-first face part 33 faces the bulge 13a.

For explanation of the positional relationship in the vehicle front-rear direction between the hit-first face part 33 in an arc shape in a plan view and the connection port 31, a most distal end part 33a of the hit-first face part 33 which is located on the vehicle-width-direction outermost side is formed at a position corresponding to the connection port 31 in the vehicle front-rear direction. Thus, the most distal end part 33a is located on a center line L of the connection port 31.

A lower end side part 19a of the oil feeding pipe 19 is connected to the connection port 31 via a rubber hose 41 having an appropriate length. As illustrated in FIG. 2 and as indicated by a virtual line of FIG. 5, the rubber hose 41 is curved rearward in the vehicle front-rear direction, and the lower end side part 19a of the oil feeding pipe 19 is fixed to a bottom face of the rear frame 12. The curved rubber hose 41 is preferably located on the vehicle-width-direction inner side relative to the most distal end part 33a of the hit-first face part 33.

The fixing of the lower end side part 19a of the oil feeding pipe 19 to the rear frame 12 is performed via a bracket 42. Specifically, as illustrated in FIG. 2, the bracket 42 has a structure in which one end in the longitudinal direction has one fixing part 42a fastened to the rear frame 12 and the other end has a holding part 42b holding the oil feeding pipe 19 so that the oil feeding pipe 19 is supported in a cantilever shape. The holding part 42b is provided with a separate clamping fitting 43 fixed by locking and bolting to clamp the oil feeding pipe 19.

In a tank structure configured as above, deformation of the connection port 31 and the mounting face part 32 at the time of side collision is suppressed as follows. When a collision load is applied to the rear frame 12 toward the vehicle-width-direction inner side due to side collision, and the rear frame 12 and the floor panel 13 are deformed, the load is transferred to the hit-first face part 33 of the tank 16. Thereby, the hit-first face part 33 is deformed in a crushed manner and absorbs collision energy. As a result, input of the collision load to the connection port 31 located on the vehicle-width-direction inner side relative to the hit-first face part 33 is avoided or suppressed, suppressing damage of the connection port 31 and the mounting face part 32.

Thus, it becomes possible to attach the oil feeding pipe 19 to the side face part 16a of the tank 16, expanding the range of the layout of the oil feeding pipe 19.

For the absorption of the collision energy at the hit-first face part 33, the hit-first face part 33 is provided at the position adjacent to the rear frame 12 in the vehicle width direction, so that the collision load in association with the deformation of the rear frame 12 is reliably transferred to the hit-first face part 33, and thus a desired effect can be expected.

The position adjacent to the rear frame 12 in the vehicle width direction in the hit-first face part 33 is provided with the protector 22, so that absorbency of the collision energy is more satisfactory.

Moreover, the hit-first face part 33 has an arc plan-view shape and thus can deal with input of the collision load from various directions, so that the collision energy absorption can be performed by receiving the deformation of the rear frame 12 regardless of the aspect of side collision.

In addition, the hit-first face part 33 has the pair of continuous faces 35 and 36 extending toward the vehicle-width-direction inner side in a plan view, and these continuous faces 35 and 36 are shaped such that the distance in the vehicle front-rear direction expands toward the vehicle-width-direction inner side, so that deformation behavior of the hit-first face part 33 toward the vehicle-width-direction inner side is expressed stably. Thus, a more reliable effect can be expected.

The hit-first face part 33 absorbs the collision energy while being crushed, so that the space S on the vehicle-width-direction outer side relative to the distal end of the connection port 31 serves as a portion which can be called a deformation allowance space or an energy absorption space. In this regard, the most distal end part 33a of the hit-first face part 33 is formed at the position corresponding to the connection port 31 in the vehicle front-rear direction. Thus, a retraction distance of the connection port 31 can be made longer, so that reliability of protection of the connection port and the like can be enhanced.

Furthermore, the portion including the hit-first face part 33 is provided in the aspect of facing the inner face of the bulge 13a of the floor panel 13. Thus, the height of the hit-first face part 33 can be secured, and the absorption of the collision energy can be performed satisfactorily. In addition, a tank capacity can also be secured.

The front-side cross member 14 having high rigidity is provided at a front end part of the floor panel 13 in the vicinity of a portion having the mounting face part 32 and the hit-first face part 33, so that protection of the connection port 31 and the like can be expected also from the viewpoint of the frame structure of the vehicle body.

Furthermore, in the configuration of protecting the connection port 31 and the mounting face part 32 in this way, there is no need to add another member only for the purpose of the protection. This tank structure can achieve the protection measure for the connection port 31 with a simple configuration and also contributes to reduction in weight of the vehicle.

Additionally, the oil feeding pipe 19 is connected to the connection port 31 via the rubber hose 41, and the lower end side part 19a of the oil feeding pipe 19 is supported on the bottom face of the rear frame 12 in a cantilever shape, so that transfer of the load can be blocked not only at the rubber hose 41 but also at the bracket 42. Thus, input of a shock load from the oil feeding pipe 19 side to the connection port 31 due to deformation at the time of side collision can be suppressed, and it is possible to protect the connection port 31 also from this viewpoint.

What is claimed is:

1. A vehicle tank structure comprising a pair of left and right rear frames extending in a vehicle front-rear direction, a floor panel coupling the rear frames, and a tank disposed below the floor panel, wherein
a side face part of the tank comprises a connection port to which an oil feeding pipe is connected, the side face part being directed toward a vehicle-width-direction outer side, and a mounting face part at which the connection port is provided, and a hit-first face part located on the vehicle-width-direction outer side relative to a distal end of the connection port, at a position corresponding to the mounting face part in the vehicle front-rear direction, are disposed at the side face part.

2. The vehicle tank structure according to claim 1, wherein
the hit-first face part is located adjacent to the rear frame in a vehicle width direction.

3. The vehicle tank structure according to claim 2, wherein
the hit-first face part comprises a pair of continuous faces extending toward a vehicle-width-direction inner side in a plan view, and
the continuous faces are shaped such that a distance between the continuous faces in the vehicle front-rear direction expands toward the vehicle-width-direction inner side.

4. The vehicle tank structure according to claim 3, wherein
a most distal end part of the hit-first face part located on a vehicle-width-direction outermost side is disposed at a position corresponding to the connection port in the vehicle front-rear direction.

5. The vehicle tank structure according to claim 4, wherein
the floor panel has a bulge, the bulge bulging upward relative to a cross member coupling the rear frames, and
an inner face of the bulge faces a portion including the hit-first face part.

6. The vehicle tank structure according to claim 1, wherein
the hit-first face part comprises a pair of continuous faces extending toward a vehicle-width-direction inner side in a plan view, and
the continuous faces are shaped such that a distance between the continuous faces in the vehicle front-rear direction expands toward the vehicle-width-direction inner side.

7. The vehicle tank structure according to claim 1, wherein
a most distal end part of the hit-first face part located on a vehicle-width-direction outermost side is disposed at a position corresponding to the connection port in the vehicle front-rear direction.

8. The vehicle tank structure according to claim 1, wherein
the floor panel has a bulge, the bulge bulging upward relative to a cross member coupling the rear frames, and
an inner face of the bulge faces a portion including the hit-first face part.

9. The vehicle tank structure according to claim 2, wherein
a most distal end part of the hit-first face part located on a vehicle-width-direction outermost side is disposed at a position corresponding to the connection port in the vehicle front-rear direction.

10. The vehicle tank structure according to claim 2, wherein
the floor panel has a bulge, the bulge bulging upward relative to a cross member coupling the rear frames, and
an inner face of the bulge faces a portion including the hit-first face part.

11. The vehicle tank structure according to claim 3, wherein
the floor panel has a bulge, the bulge bulging upward relative to a cross member coupling the rear frames, and
an inner face of the bulge faces a portion including the hit-first face part.

12. The vehicle tank structure according to claim 6, wherein
a most distal end part of the hit-first face part located on a vehicle-width-direction outermost side is disposed at a position corresponding to the connection port in the vehicle front-rear direction.

13. The vehicle tank structure according to claim 6, wherein
the floor panel has a bulge, the bulge bulging upward relative to a cross member coupling the rear frames, and
an inner face of the bulge faces a portion including the hit-first face part.

14. The vehicle tank structure according to claim 7, wherein
the floor panel has a bulge, the bulge bulging upward relative to a cross member coupling the rear frames, and
an inner face of the bulge faces a portion including the hit-first face part.

15. The vehicle tank structure according to claim 9, wherein
the floor panel has a bulge, the bulge bulging upward relative to a cross member coupling the rear frames, and
an inner face of the bulge faces a portion including the hit-first face part.

16. The vehicle tank structure according to claim 12, wherein
the floor panel has a bulge, the bulge bulging upward relative to a cross member coupling the rear frames, and
an inner face of the bulge faces a portion including the hit-first face part.

* * * * *